US007616799B2

(12) United States Patent
Ramamurthy et al.

(10) Patent No.: US 7,616,799 B2
(45) Date of Patent: Nov. 10, 2009

(54) SYSTEM AND METHOD FOR MONITORING DISEASE PROGRESSION OR RESPONSE TO THERAPY USING MULTI-MODAL VISUALIZATION

(75) Inventors: Venkat Raghavan Ramamurthy, Malvern, PA (US); Arun Krishnan, Exton, PA (US); Christian Beldinger, Algonquin, IL (US); Juergen Soldner, Cary, IL (US); Maxim Mamin, Erlangen (DE); Axel Barth, Erlangen (DE); Stefan Käpplinger, Jena (DE); Michael Gluth, McHenry, IL (US); Peggy Hawman, Schaumburg, IL (US); Darrell Burckhardt, Hoffman Estates, IL (US); Axel Platz, München (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 671 days.

(21) Appl. No.: 11/146,788

(22) Filed: Jun. 7, 2005

(65) Prior Publication Data

US 2006/0030768 A1     Feb. 9, 2006

Related U.S. Application Data

(60) Provisional application No. 60/581,136, filed on Jun. 18, 2004.

(51) Int. Cl.
    *G06K 9/36*     (2006.01)

(52) U.S. Cl. ........................................ 382/131; 382/294

(58) Field of Classification Search ................ 382/128, 382/131, 132, 294; 128/922; 715/764, 776, 715/777, 779
See application file for complete search history.

(56) References Cited

U.S. PATENT DOCUMENTS

| | | | | |
|---|---|---|---|---|
| 6,266,453 | B1 * | 7/2001 | Hibbard et al. | 382/294 |
| 6,363,163 | B1 | 3/2002 | Xu et al. | 382/130 |
| 6,484,047 | B1 * | 11/2002 | Vilsmeier | 600/407 |
| 6,904,163 | B1 * | 6/2005 | Fujimura et al. | 382/131 |
| 7,110,616 | B2 | 9/2006 | Ditt et al. | 382/284 |
| 7,130,457 | B2 | 10/2006 | Kaufman et al. | 382/128 |
| 2001/0036302 | A1 * | 11/2001 | Miller | 382/128 |
| 2002/0028006 | A1 * | 3/2002 | Novak et al. | 382/128 |

(Continued)

FOREIGN PATENT DOCUMENTS

WO     WO 03/077202 A1     9/2003

OTHER PUBLICATIONS

"VETOT, Volume Estimation and Tracking Over Time: Framework and Validation", Guyon et al., Lecture Notes in Computer Science; Medical Image Computing and Computer-Assisted Intervention, MICCAI 2003—6th International Conference Proceedings 2003, vol. 2879, No. Part 2, 2003, pp. 142-149.

(Continued)

*Primary Examiner*—Andrew W Johns

(57) ABSTRACT

A system and method for monitoring disease progression or response to therapy using multi-modal visualization are provided. The method comprises: selecting a first image dataset of a first timepoint; loading the first image dataset of the first timepoint; selecting a second image dataset of a second timepoint; loading the second image dataset of the second timepoint; registering the first image dataset of the first timepoint and the second image dataset of the second timepoint; and displaying the first image dataset of the first timepoint and the second image dataset of the second timepoint.

19 Claims, 17 Drawing Sheets

U.S. PATENT DOCUMENTS

| | | | |
|---|---|---|---|
| 2003/0016850 A1* | 1/2003 | Kaufman et al. | 382/128 |
| 2003/0216631 A1* | 11/2003 | Bloch et al. | 600/407 |
| 2005/0065421 A1 | 3/2005 | Burckhardt | |
| 2005/0149877 A1* | 7/2005 | Rice et al. | 715/764 |
| 2007/0160312 A1* | 7/2007 | Blaffert et al. | 382/294 |

OTHER PUBLICATIONS

"Analyzedirect: Analyze 5.0", Users Manual, Apr. 5, 2004, retrieved from the internet, http://analyzedirect.com/support/downloads.asp.

"A Survey of Medical Image Registration", Maintz et al., Medical Image Analysis, Oxford University Press, Oxford, GB, vol. 2, No. 1, 1998, pp. 1-37.

"VETOT: Volume Estimation and Tracking Over Time", Guyon, Online! 2003, retrieved from the internet, http://caddlab.rad.unc.edu/software/Vetot/vetot.html.

"Valmet: A New Validation tool for assessing and improving 3D object segmentation", Gerig et al., MICCAI 2001, LNCS 2208, 2001, pp. 516-523.

International Search Report including Notification of Transmittal of the International Search Report, International Search Report and Written Opinion of the International Searching Authority, PCT Application No. PCT/US2005/021215, mailed Jan. 20, 2006.

\* cited by examiner

SYSTEM AND METHOD FOR MONITORING DISEASE PROGRESSION OR RESPONSE TO THERAPY USING MULTI-MODAL VISUALIZATION

CROSS-REFERENCE TO RELATED APPLICATION

This application claims the benefit of U.S. Provisional Application No. 60/581,136, filed Jun. 18, 2004, a copy of which is herein incorporated by reference.

BACKGROUND OF THE INVENTION

1. Technical Field

The present invention relates to medical image analysis, and more particularly, to a system and method for monitoring disease progression or response to therapy using multi-modal visualization.

2. Discussion of the Related Art

Functional imaging using single photon emission computed tomography (SPECT) and positron emission tomography (PET) is extremely valuable in the diagnosis of various medical disorders. Uncertainty in the anatomic definition on SPECT and PET images, however, sometimes limits their usefulness. To overcome this, a combination of magnetic resonance images (MRI) and X-ray computed tomography (CT) images with functional SPECT or PET images of the same sections of the body is sometimes used. This provides complementary anatomic (MRI or CT) and physiological (SPECT or PET) information that is of great importance to research, diagnosis and treatment.

Functional body images and structural images are two types of medical images used by medical practitioners for the diagnosis of certain medical disorders. Functional body images such as those derived from SPECT or PET scans, provide physiological information, whereas structural images such as those derived from CT or MRI, provide an anatomic map of the body. Different medical imaging techniques may provide scans with complementary and occasionally conflicting information. For example, the combination of such images (via image fusion or image registration) using picture archiving communications systems (PACS) can often lead to additional clinical information not apparent in the separate images. Thus, by imposing a structural anatomic framework on a set of functional images, the position of a tumor or other lesion in a later functional image may be determined even where there is insufficient anatomic detail.

Although the construction of a composite, overlapping medical image with image registration has been primarily used in the fusion of functional and anatomical images, it has also been applied to a series of the same modality of images. Examples of this are registration of SPECT images of the same subject in follow-up studies or in a comparison of an image with normal uptake properties to an image with suspected abnormalities. In addition, image registration of SPECT and PET images and the registration of SPECT and PET images with anatomic atlases provide an important means to evaluate comparative uptake properties of SPECT and PET radiopharmaceuticals, and to correlate uptake properties with anatomy.

Multi-modal medical image registration is fast becoming a visualization tool that can significantly aid in the early detection of tumors and other diseases and aid in improving the accuracy of diagnosis. For example, radiologists often have difficulty locating and accurately identifying cancer tissue, even with the aid of structural information such as CT and MRI because of the low contrast between the cancer and the surrounding tissues in CT and MRI images. However, by using SPECT and radioactively labeled monoclonal antibodies it is possible to obtain high contrast images of the concentration of antibodies in tumors.

It is thus becoming increasingly desirable to combine the output and strengths of multiple medical imaging systems. However, certain drawbacks exist due to combining different file structures, the transfer and networking thereof and registration and visualization of the composite images. For example, such systems typically do not support more than a few combinations of datasets from different modalities. In addition, many systems do not provide a quick and accurate means for analyzing changes in tumors. Further, many systems do not provide a quick technique for aligning medical images from different timepoints. For example, to accurately analyze changes in tumors, it is often necessary to compare images of the same modality that were scanned at different timepoints.

Accordingly, there is a need for a technique that enables medical practitioners to compare patient scans taken at a different times using the same or different modalities so that medical practitioners can make better-informed diagnostic, therapy and follow-up decisions in a cost-effective and efficient manner.

SUMMARY OF THE INVENTION

The present invention overcomes the foregoing and other problems encountered in the known teachings by providing a system and method for monitoring disease progression or response to therapy using multi-modal visualization.

In one embodiment of the present invention, a method for multi-modal visualization, comprises: selecting a first image dataset of a first timepoint; loading the first image dataset of the first timepoint; selecting a second image dataset of a second timepoint; loading the second image dataset of the second timepoint; registering the first image dataset of the first timepoint and the second image dataset of the second timepoint; and displaying the first image dataset of the first timepoint and the second image dataset of the second timepoint.

The first image dataset of the first timepoint and the second image dataset of the second timepoint each comprise data acquired from one of a computed tomography (CT), positron emission tomography (PET), single photon emission computed tomography (SPECT), magnetic resonance (MR) and ultrasound modality.

The first image dataset of the first timepoint and the second image dataset of the second timepoint each comprise one of a CT image series and MR image series, a PET image series and SPECT image series, a combination of aCT and PET image series, a combination of an MR and PET image series, a combination of a CT and SPECT image series, a combination of an MR and SPECT image series and an ultrasound image series.

The image series in each of the first image dataset of the first timepoint and the second image dataset of the second timepoint comprise data from one of a pre-therapy, ongoing therapy and post-therapy study.

The first image dataset of the first timepoint and the second image dataset of the second timepoint are registered using one of automatic registration, landmark registration and visual registration. The automatic registration used during the step of registering the first image dataset of the first timepoint and the second image dataset of the second timepoint, comprises: registering a first image series with a second image series of the first image dataset of the first timepoint; registering the first image series of the first image dataset of the first timepoint with a first image series of the second image dataset of the second timepoint; and registering the first image series of the second image dataset of the second timepoint with a second image series of the second image dataset of the second timepoint.

The step of displaying the first image dataset of the first timepoint and the second image dataset of the second timepoint comprises: displaying a first image series and a second image series of the first image dataset of the first timepoint and a first image series and a second image series of the second image dataset of the second timepoint.

The method further comprises: drawing a volume of interest (VOI) on one of the first image series or second image series of the first image dataset of the first timepoint and the first image series or second image series of the second image dataset of the second timepoint; copying the VOI onto remaining image series of the first image dataset of the first timepoint and second image dataset of the second timepoint; and linking the VOIs of the first image series and second image series of the first image dataset of the first timepoint and the first image series and second image series of the second image dataset of the second timepoint. The VOI is one of a lesion, tumor and cancerous region The method further comprises quantifying the VOIs on the first image series and second image series of the first image dataset of the first timepoint and the first image series and second image series of the second image dataset of the second timepoint. The quantification is one of a minimum deviation, maximum deviation, standard deviation, average, volume, mean, diameter, area, number of pixels and centroid.

The method further comprises: detecting a change in the VOIs; generating a report associated with the quantified VOIs; calculating a maximum intensity projection (MIP) of one of the first image dataset of the first timepoint and the second image dataset of the second timepoint; and displaying the MIP; and coordinating the MIP with the first image dataset of the first timepoint and the second image dataset of the second timepoint.

In another embodiment of the present invention, a user interface for multi-modal visualization, comprises: a first display area for displaying a first image dataset of a first timepoint and a second image dataset of a second timepoint to compare the first image dataset of the first timepoint and the second image dataset of the second timepoint; a second display area for displaying a control area, wherein the control area comprises a patient folder, a workflow pane and controls; wherein the first image dataset of the first timepoint and the second image dataset of the second timepoint each comprise data acquired from one of a computed tomography (CT), positron emission tomography (PET), single photon emission computed tomography (SPECT), magnetic resonance (MR) and ultrasound modality.

The first image dataset of the first timepoint and the second image dataset of the second timepoint each comprise one of a CT image series and MR image series, a PET image series and SPECT image series, a combination of a CT and PET image series, a combination of an MR and PET image series, a combination of a CT and SPECT image series, a combination of an MR and SPECT image series and an ultrasound series.

The image series in each of the first image dataset of the first timepoint and the second image dataset of the second timepoint comprise data from one of a pre-therapy, ongoing therapy and post-therapy study.

The first image dataset of the first timepoint and the second image dataset of the second timepoint are each displayed in one of a sagittal view, coronal view and axial view, the first image dataset and the second image dataset are displayed in a fused view.

The workflow pane comprises a link to one of a registration pane, visualization pane, maximum intensity projection (MIP) pane, contour pane and report pane.

In yet another embodiment of the present invention, a system for multi-modal visualization, comprises: a memory device for storing a program; a processor in communication with the memory device, the processor operative with the program to: select a first image dataset of a first timepoint and a second image dataset of a second timepoint; load the first image dataset of the first timepoint and the second image dataset of the second timepoint; register the first image dataset of the first timepoint and the second image dataset of the second timepoint; and display the first image dataset of the first timepoint and the second image dataset of the second timepoint.

The first image dataset of the first timepoint and the second image dataset of the second timepoint each comprise data acquired from one of a computed tomography (CT), positron emission tomography (PET), single photon emission computed tomography (SPECT), magnetic resonance (MR) and ultrasound modality.

The first image dataset of the first timepoint and the second image dataset of the second timepoint each comprise one of a CT image series and MR image series, a PET image series and SPECT image series, a combination of a CT and PET image series, a combination of an MR and PET image series, a combination of a CT and SPECT image series, a combination of an MR and SPECT image series and an ultrasound image series.

The image series in each of the first image dataset of the first timepoint and the second image dataset of the second timepoint comprise data from one of a pre-therapy, ongoing therapy and post-therapy study.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Exemplary embodiments of the present invention are directed to a multi-modality application that allows the comparison of two or more studies to each other. This is typically done by comparing an initial diagnosis with a follow-up scan after treatment. For example, the present invention may be used in oncology cases where one or several follow-up studies are performed to evaluate disease progression and response to therapy. The present invention may also be applied in medical modalities where change detection can be used to detect lesions, tumors, cancers, etc.

For example, the present invention may be used in the following areas of medical imaging: therapy response monitoring by performing change detection using computed tomography (CT) or Magnetic Resonance (MR) images—positron emission tomography (PET) or CT—single photon emission computed tomography (SPECT) over time; bone cancer detection by performing bone segmentation and lesion detection; liver cancer detection using perfusion and spectroscopy; breast cancer detection combining perfusion and spectroscopy and characterizing benign or malignant tumors; and neurology by using semi-automatic and automatic tools for volumetry of brain structures like hippocampal volumes.

The modalities for use with the present invention are, for example: static attenuation corrected (AC) PET, static non-attenuation corrected (NAC) PET and respiratory-gated PET; static AC SPECT or nuclear medicine (NM) and static NAC SPECT or NM; high-resolution CT, low-resolution CT, spiral CT and respiratory-gated CT; high-resolution magnetic resonance (MR) images; and ultrasound. The present invention may load gantry-titled datasets. In addition, the present invention is capable of accepting an image series containing unequally spaced slices or an image series containing overlapping slices.

The present invention may further load static AC PET or static NAC PET datasets fused together with corresponding registered CT datasets from one patient study, acquired via a PET/CT scanner or on separate devices. In addition, static AC SPECT or static NAC SPECT datasets fused together with corresponding registered CT datasets from one patient study, acquired via a SPECT/CT scanner or on separate devices may be loaded. Further, two series of the same modality type may be loaded and displayed fused within a single timepoint. For example, the present invention may allow a CT dataset fused together with another CT dataset, where both datasets were acquired via the same CT scanner or different devices.

Figure 1:
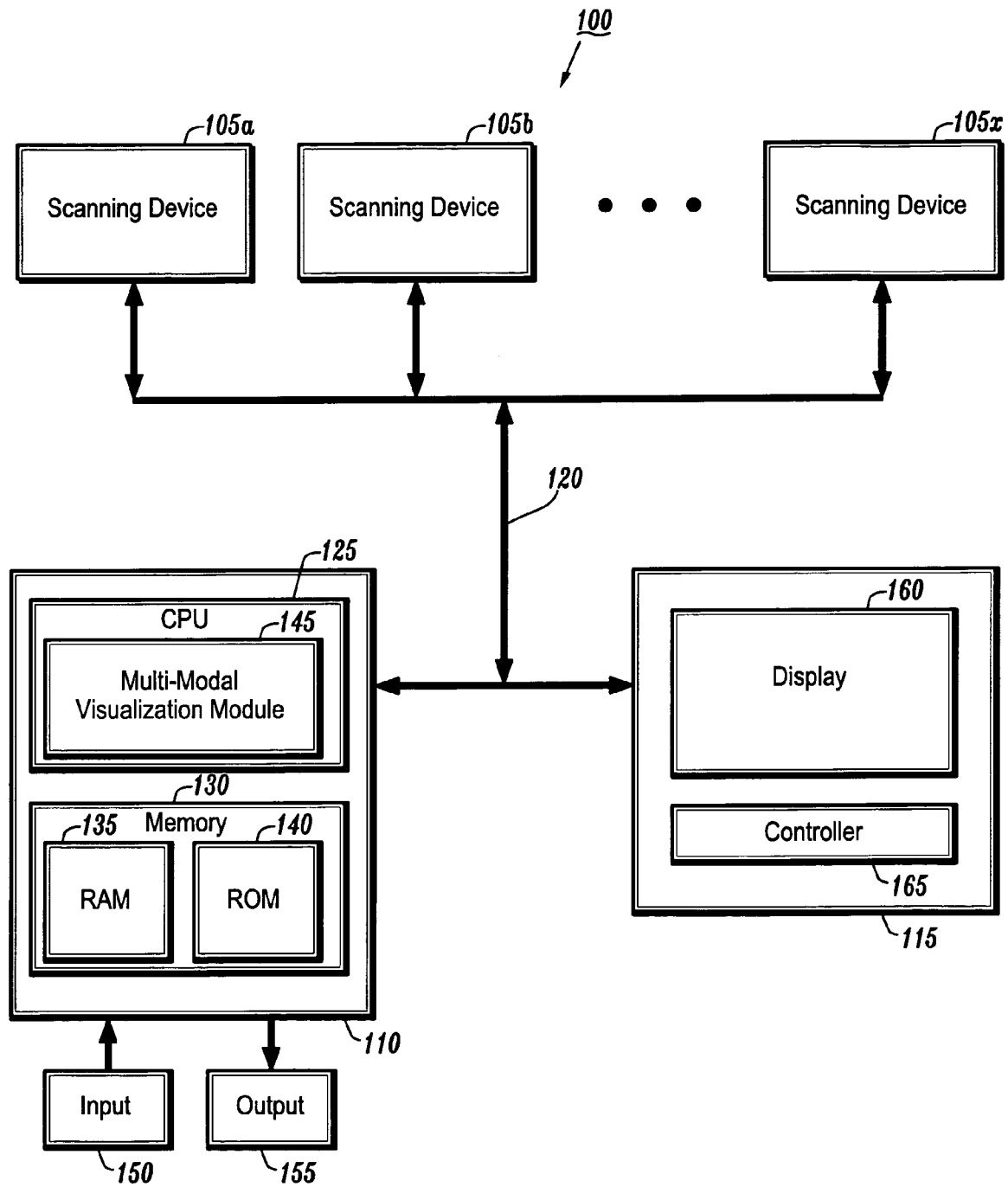
FIG. 1 is a block diagram of a system for multi-modal visualization according to an exemplary embodiment of the present invention.

FIG. 1 is a block diagram of a system 100 for monitoring disease progression or response to therapy using multi-modal visualization according to an exemplary embodiment of the present invention.

As shown in FIG. 1, the system 100 includes, inter alia, several scanning devices 105a, b . . . x, a computer 110 and an operator's console 115 connected over a network 120. The scanning devices 105a, b . . . x may each be one of an MR imaging device, CT imaging device, helical CT device, PET device, SPECT device, hybrid PET-CT device, hybrid SPECT-CT device, two-dimensional (2D) or three-dimensional (3D) fluoroscopic imaging device, 2D, 3D, or four-dimensional (4D) ultrasound imaging device, or an x-ray device. In addition to the aforementioned scanning devices, one or all of the scanning devices 105a, b . . . x may be a multi-modal or hybrid scanning device that is capable of scanning, for example, in a PET mode, SPECT mode or MR mode or generate PET and CT scans from a single hybrid device.

The computer 110, which may be a portable or laptop computer, a personal digital assistant (PDA), etc., includes a central processing unit (CPU) 125 and a memory 130, which are connected to an input 150 and an output 155. The CPU 125 includes a multi-modal visualization module 145 that includes one or more methods for monitoring disease progression or response to therapy using multi-modal visualization.

The memory 130 includes a random access memory (RAM) 135 and a read only memory (ROM) 140. The memory 130 can also include a database, CD, DVD, disk drive, etc., or a combination thereof. The RAM 135 functions as a data memory that stores data used during execution of a program in the CPU 125 and is used as a work area. The ROM 140 functions as a program memory for storing a program executed in the CPU 125. The input 150 is constituted by a keyboard, mouse, etc., and the output 155 is constituted by a liquid crystal display (LCD), cathode ray tube (CRT) display, or printer.

The operation of the system 100 is controlled from the operator's console 115, which includes a controller 165, for example, a keyboard, and a display 160, for example, a CRT display. The operator's console 115 communicates with the computer 110 and the scanning device 105 so that 2D image data collected by the scanning devices 105a, b . . . x can be rendered into 3D data by the computer 110 and viewed on the display 160. It is to be understood that the computer 10 can be configured to operate and display information provided by the scanning devices 105a, b . . . x absent the operator's console 115, using, for example, the input 150 and output 155 devices to execute certain tasks performed by the controller 165 and display 160.

The operator's console 115 further includes any suitable image rendering system/tool/application that can process digital image data of an acquired image dataset (or portion thereof) to generate and display 2D and/or 3D images on the display 160. More specifically, the image rendering system may be an application that provides 2D/3D rendering and visualization of medical image data, and which executes on a general purpose or specific computer workstation. The computer 110 may also include an image rendering system/tool/ application for processing digital image data of an acquired image dataset to generate and display 2D and/or 3D images.

As shown in FIG. 1, the multi-modal visualization module 145 may also be used by the computer 110 to receive and process digital medical image data, which as noted above, may be in the form of raw image data, 2D reconstructed data (e.g., axial slices), or 3D reconstructed data such as volumetric image data or multiplanar reformats, or any combination of such formats. The data processing results can be output from the computer 110 via the network 120 to an image rendering system in the operator's console 115 for generating 2D and/or 3D renderings of image data in accordance with the data processing results, such as segmentation of organs or anatomical structures, color or intensity variations, and so forth.

Figure 2:
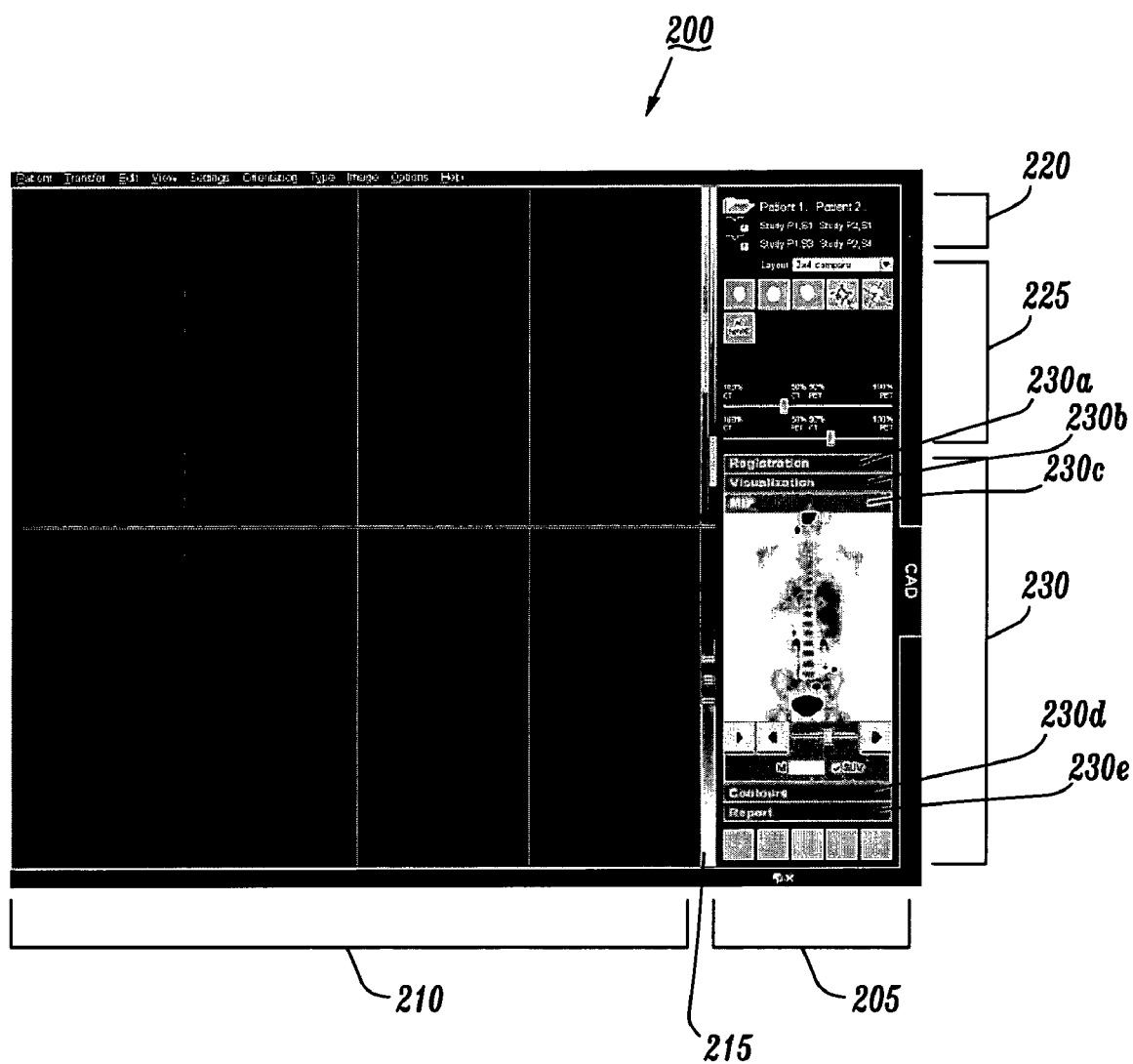
FIG. 2 is a user interface according to an exemplary embodiment of the present invention.

FIG. 2 illustrates a user interface 200 according to an exemplary embodiment of the present invention. As shown in FIG. 2, the user interface 200 includes a control area 205, display area 210 and color or blend bars 215. The control area 205 includes items such as a patient folder 220, control icons and buttons 225 and workflow pane 230. The control area 205 is an area where various tools or items are found for operating an application in accordance with the present invention. The display area 210 is an area where 2D and 3D images are displayed. The color bars 215 are used to set the color distribution of displayed images. The color bars 215 may also include blending sliders for adjusting blend factors or mixing ratios of the displayed images.

The workflow pane 230 includes links to a registration pane 230a, visualization pane 230b, maximum intensity projection (MIP) pane 230c, contour pane 230d and report pane 230e. The links allow a user to perform certain functions provided by each of the panes 230a-e. In addition, the links are configured such that they perform their functions in a stepwise fashion. In other words, the workflow pane 230 sequentially guides the user to first use the registration pane 230a for registering image datasets of a timepoint, use the visualization pane 230b for visualizing the images and so forth.

Figure 3:
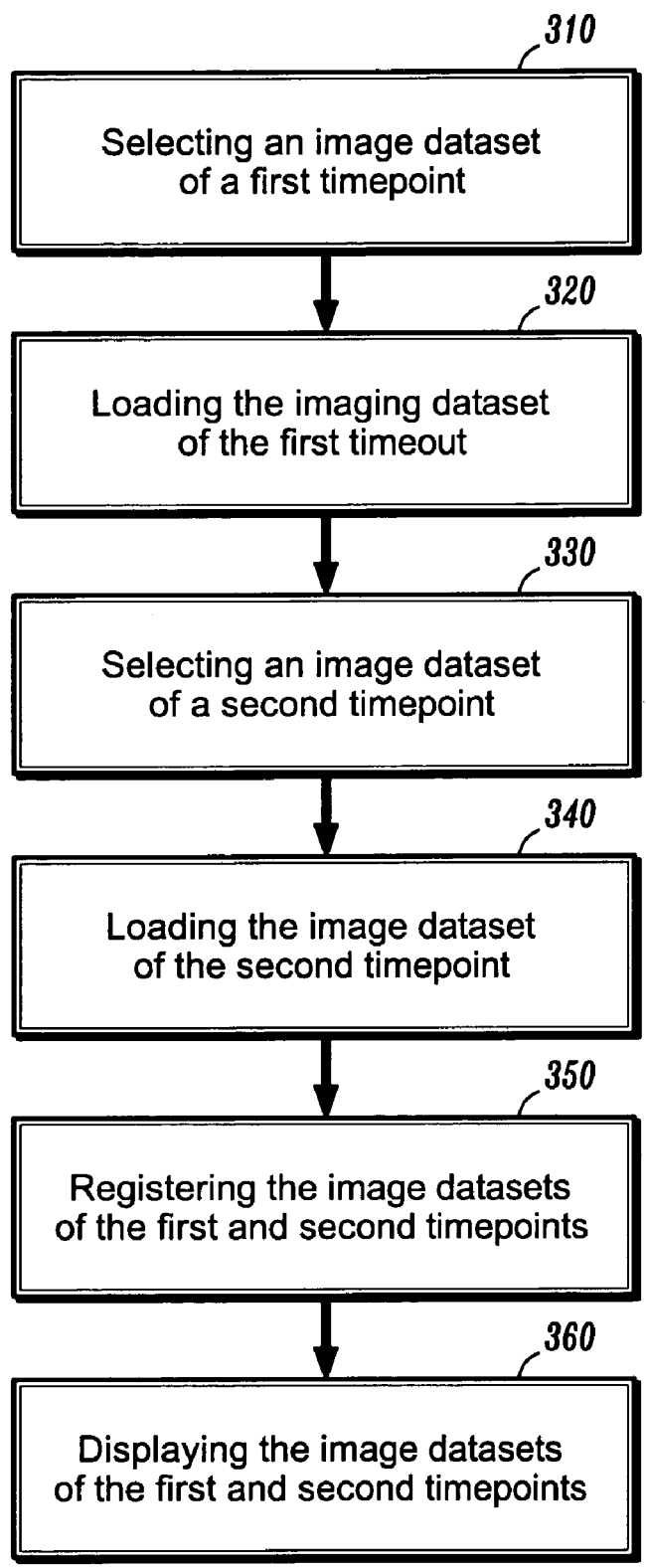
FIG. 3 is a flowchart illustrating a method for multi-modal visualization according to an exemplary embodiment of the present invention.
Figure 4:
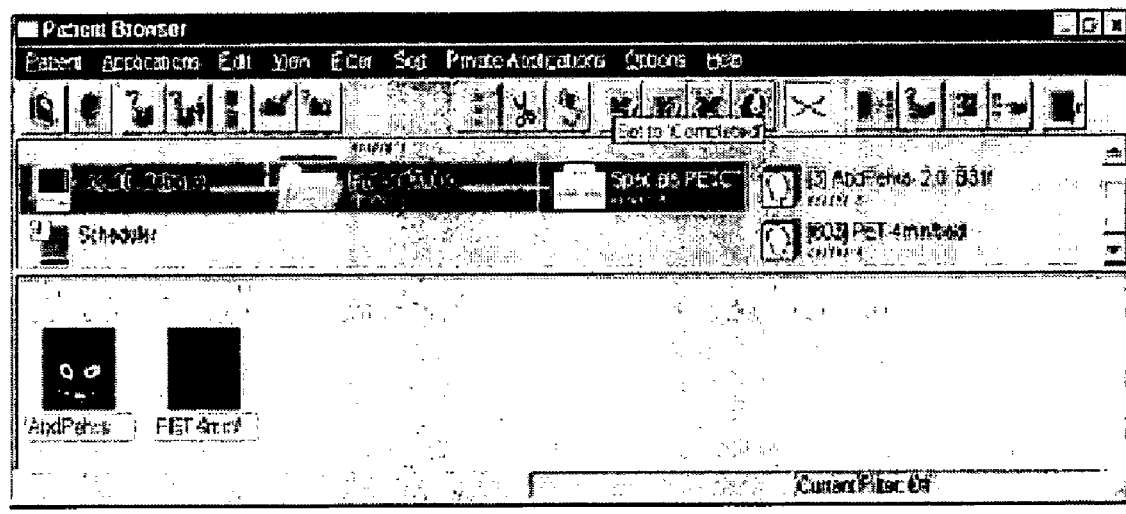
FIG. 4 is a patient browser according to an exemplary embodiment of the present invention.

FIG. 3 is a flowchart illustrating a method for monitoring disease progression or response to therapy using multi-modal visualization according to an exemplary embodiment of the present invention. As shown in FIG. 3, an image dataset of a first timepoint is selected by a user via a patient browser 400 of FIG. 4 (310). The first timepoint may include one of the following combinations of image datasets: a single CT series; a single PET series; a single SPECT series; a combination of a CT and PET series from the same study or from different studies; and a combination of a CT and SPECT series from the same study or from different studies. Exemplary dataset combinations for a single timepoint are listed below in Table 1.

TABLE 1

| DATASETS OR COMBINATIONS FOR A SINGLE TIMEPOINT |
|---|
| A single CT series |
| A single PET-AC series |
| A single PET-NAC series |
| A single SPECT-AC series |
| A single SPECT-NAC series |
| CT series + PET-AC series |
| CT series + PET-NAC series |
| CT series + SPECT-AC series |
| CT series + SPECT-NAC series |
| A single MR series |
| MR series + PET-AC series |

TABLE 1-continued

| DATASETS OR COMBINATIONS FOR A SINGLE TIMEPOINT |
|---|
| MR series + PET-NAC series |
| MR series + SPECT-AC series |
| MR series + SPECT-NAC series |

Figure 5:
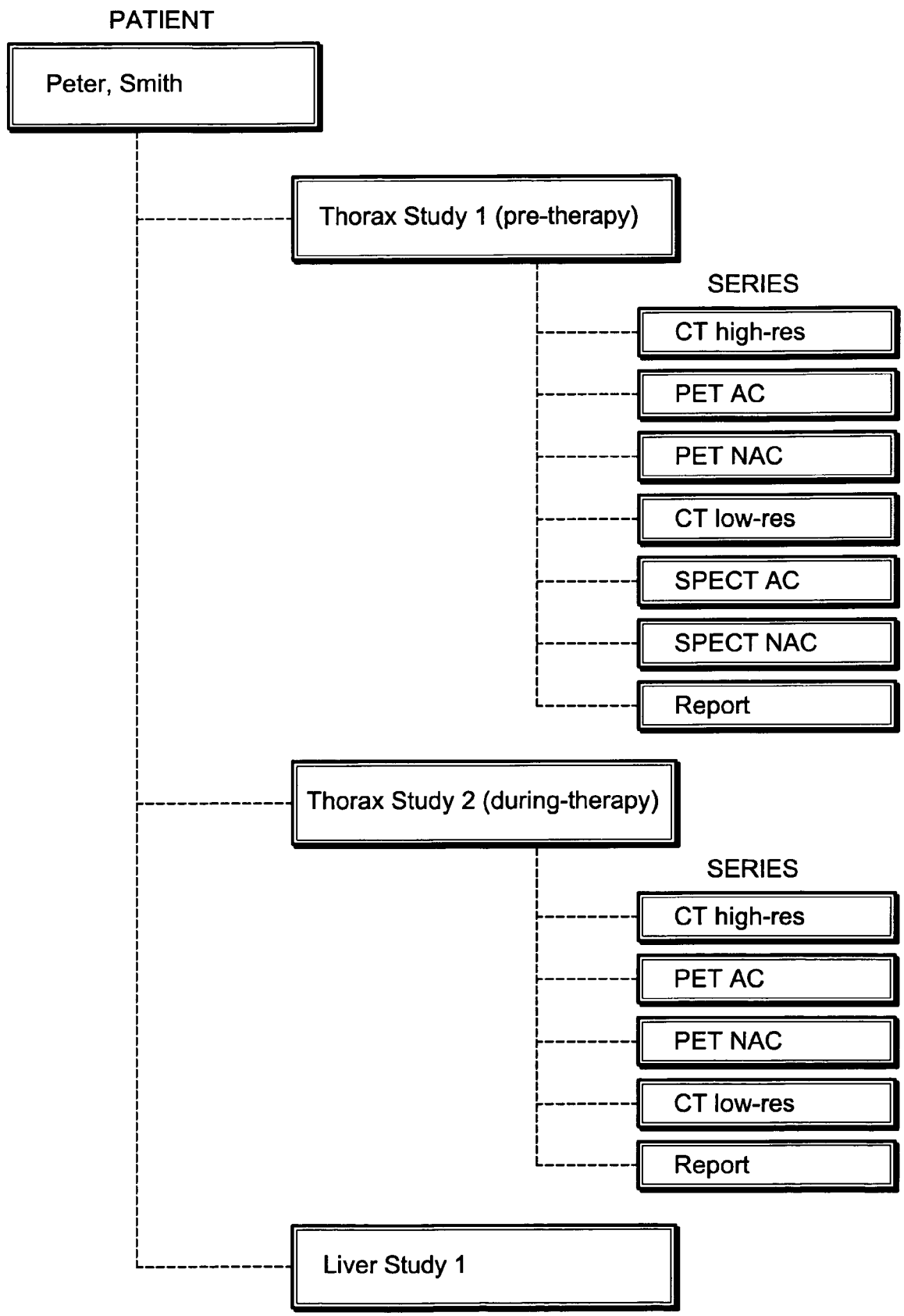
FIG. 5 is a chart illustrating a hierarchy for creating a timepoint according to an exemplary embodiment of the present invention.

The image datasets of the first timepoint and subsequent timepoints could be from pre-therapy, during-therapy or post-therapy studies. In addition, the same image series can be included as a series in both the first timepoint and subsequent timepoints. For example, in a sample patient hierarchy depicted in FIG. 5, a high-resolution CT series and PET AC series could be combined to form the first timepoint and the high-resolution CT series and a PET NAC series could be combined to form a second timepoint. In other words, a single timepoint could contribute to the first and second timepoints.

After selecting the image dataset of the first timepoint, the image dataset is loaded (320). The image dataset can be loaded in the following ways: dragging and dropping the selected image dataset from the patient browser 400 onto the display area 210; clicking an extension button on the patient browser 400 and double-clicking relevant data on the patient browser 400. For example, a user can perform the relevant selection in the patient browser 400 and click a button for loading. The level of selection of the data in the patient browser 400 can be at series, study or at the patient level.

An image series containing unequidistant slices or overlapping slices can also be loaded. In addition, multi-frame images and different types of NM images such as NM RECON TOMO (e.g., a volume as a number of frames within a single image) can be loaded. Further, spiral CT scan data can be loaded. Once such data is loaded it is validated using image header information. In this manner, when studies containing different patient header information for single as well as multiple timepoints are selected for loading, a warning dialog may pop-up to indicate to the user that the patient IDs are different and thus indicate the correct manner for loading an image series. The warning dialog may also be used to prompt the user to modify the patient IDs. After the data is validated, a volume is constructed based on the image series. Images associated with the volume are then displayed as will be discussed hereinafter with reference to FIG. 8.

Once the image dataset of the first timepoint is loaded, an image dataset of a second timepoint may be selected (330). Similar to selecting the image dataset of the first timepoint, the image dataset of the second timepoint may be selected via the patient browser 400. In addition, the second timepoint may be one of the image series described above for the first timepoint. After selecting the second timepoint for loading, it is loaded (340). Again, the second timepoint is loaded using one of the techniques described above for the loading the first timepoint. The second timepoint is loaded so that it may be compared to the first timepoint. Thus, once the second timepoint is loaded and subsequently displayed, a medical practitioner will be able to compare or diagnose medical conditions or response to therapy across the datasets of the first and second timepoints.

When loading the second timepoint, it is determined if it is a valid combination of datasets for multiple timepoint loading and then sorted. A list of the valid combinations of datasets for multiple timepoint loading is shown below in Table 2.

TABLE 2

| FIRST TIMEPOINT | SECOND TIMEPOINT |
| --- | --- |
| PET AC alone or with NAC | PET AC alone or with NAC |
| | PET AC alone or with NAC + CT |
| | PET AC alone or with NAC + MR |
| | SPECT |
| SPECT AC alone or with NAC | SPECT AC alone or with NAC |
| | SPECT AC alone or with NAC + CT |
| | SPECT AC alone or with NAC + MR |
| | PET |
| CT | CT |
| | CT + PET AC alone or with NAC |
| | CT + SPECT AC alone or with NAC |
| | MR |
| MR | MR |
| | MR + PET AC alone or with NAC |
| | MR + SPECT AC alone or with NAC |
| | CT |
| PET AC alone or with NAC + CT | PET AC alone or with NAC |
| | CT |
| | PET AC alone or with NAC + CT |
| | MR |
| | SPECT |
| SPECT AC alone or with NAC + CT | SPECT AC alone or with NAC |
| | CT |
| | SPECT AC alone or with NAC + CT |
| | MR |
| | PET |

Figure 6:
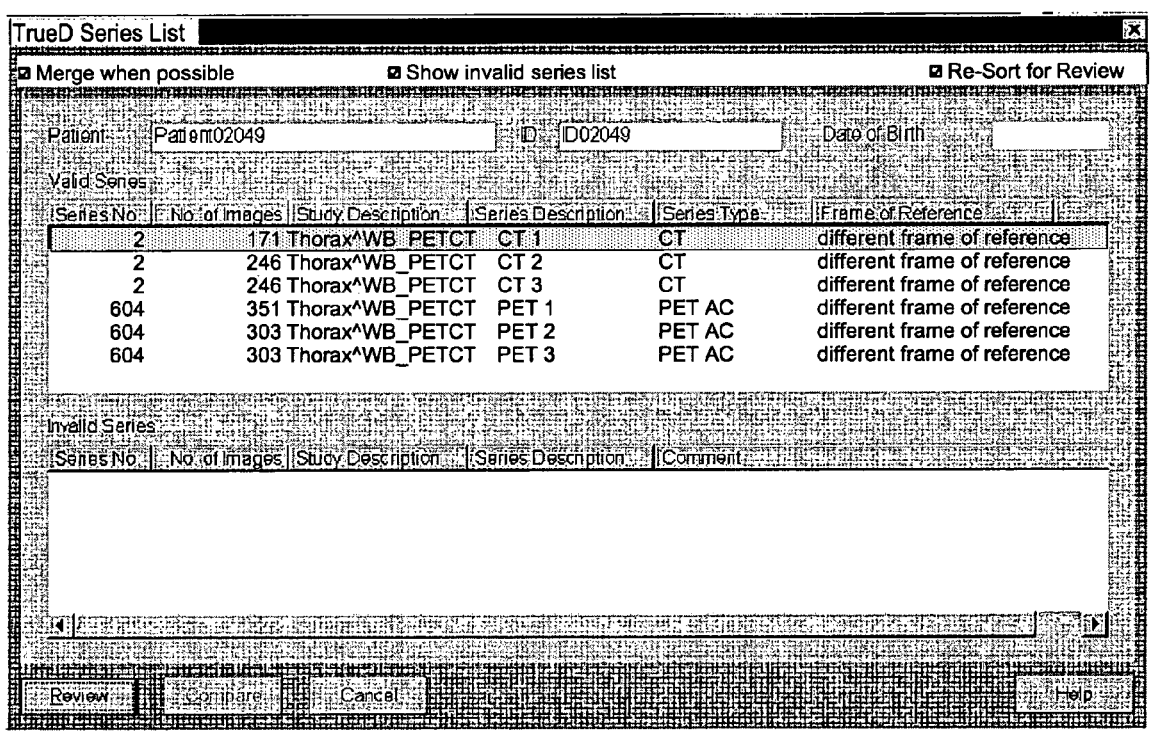
FIG. 6 is a series list dialog showing valid and invalid image series of timepoints for loading according to an exemplary embodiment of the present invention.

As shown in Table 2, if for example, a first timepoint is already loaded containing a SPECT AC dataset alone or with a NAC dataset, any one of the SPECT NAC dataset from the first timepoint, SPECT AC dataset alone or with the NAC dataset and a SPECT AC dataset alone or with an NAC dataset and a CT dataset may be loaded as the second timepoint. If, however, the second timepoint is not one of the valid combinations of datasets for loading, then a series dialog 600 of FIG. 6 may be displayed indicating valid combinations of datasets for loading to the user.

As further shown in Table 2, the PET or SPECT AC and NAC datasets are not listed separately because it is assumed that whenever the user selects the PET AC dataset and loads, the PET AC dataset will be displayed. Similarly, when the user selects the PET NAC dataset and loads, the PET NAC dataset will be loaded and displayed along with a CT dataset. The user can then toggle between the PET AC and PET NAC datasets. The same functionality also holds true for the SPECT AC/NAC datasets.

After the image datasets of the first and second timepoints have been loaded, they are registered (350). Registration is the process of aligning medical image data. In other words, it is a procedure used to align two input image series generated by different modalities or by one modality at different times. During registration, one of the datasets will be fixed, e.g., in an unchanged position, and the other data set will be transformed, e.g., translated, rotated and scaled to align the two datasets. The fixed dataset may also be referred to as the reference volume and the dataset to be transformed may be referred to as the model volume. Thus, a geometrical transformation is performed for the model volume to match the anatomy of the reference volume.

Figure 7:
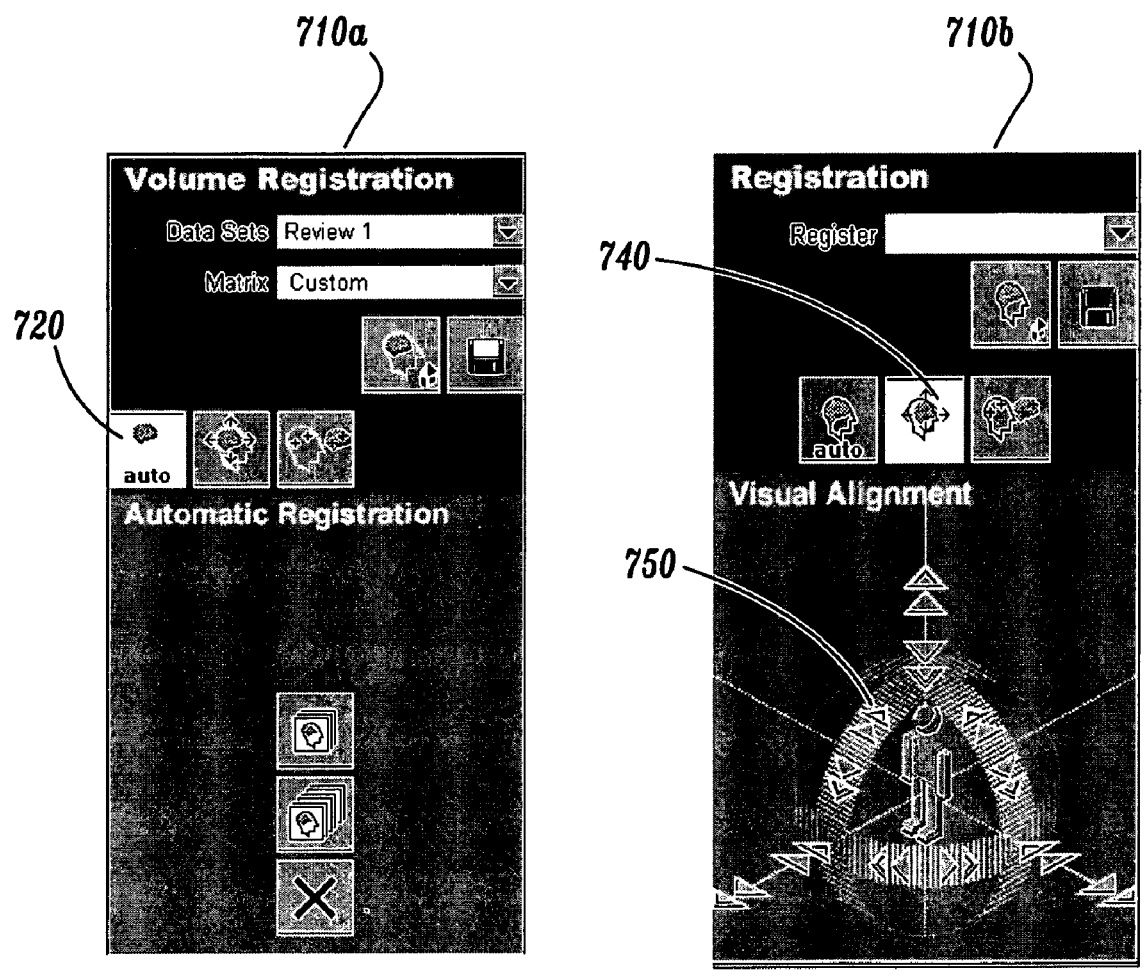
FIG. 7 illustrates a pair of registration panes according to an exemplary embodiment of the present invention.

To initiate the registration process, the user may click on one of the panes found in the workflow pane 230 of the user interface 200. For example, the user may click on a registration pane 710a or 710b of FIG. 7. The registration pane 710a or 710b includes a set of controls associated with the different registration methods for use with the present invention. For example, the user may select an auto button 720 in the registration pane to initiate an automatic registration. Similarly, the user may select a visualize button 740 in the registration pane 710b to initiate a visual alignment.

In step 350, the several registration methods/algorithms may be used. They may be, for example: automatic/mutual information registration (e.g., automatic registration); landmark registration and visual alignment (e.g., manual matching).

Automatic registration is a fully automated matching algorithm based on mutual information or normalized mutual information. Prior to initiating automatic registration, however, the user could perform a visual alignment to improve the performance of the automatic registration.

Automatic registration comprises the steps of: registering a first image series with a second image series of the first image dataset of the first timepoint; registering the first image series of the first image dataset of the first timepoint with a first image series of the second image dataset of the second timepoint; and registering the first image series of the second image dataset of the second timepoint with a second image series of the second image dataset of the second timepoint.

For example, when two CT-PET scans are loaded, registration of the CT-PET scans begins for both first and second timepoints in sequence. Once the CT-PET registrations are completed, a registration is initiated to match the two CT studies across the first and second timepoints. While the automatic registration takes place, the progress of the registration can be visualized in alpha blended images (e.g., fused images). A progress text may also be displayed indicating the current progress of the automatic registration.

Landmark registration is the identification of known marks at unisonous positions in both image series. From that identification, the algorithm calculates the registration. Visual alignment is done on a fused dataset. The reference series remains fixed and using visual alignment controls 750, the model series can be translated/rotated to align with the reference image.

After registering the image datasets of the first and second timepoints, they are displayed (360). They may be displayed, for example, on the display area 210 of the user interface 200. It is to be understood that each of the image datasets of the first and second timepoints could be displayed as soon as it is loaded. In addition, the image datasets of the first and second timepoints could be displayed as they are being registered. Further, the step or steps of registering may also occur simultaneous to the step or steps of loading. Once the image datasets of the first and second timepoints are displayed, the user may then compare the first and second timepoints to each other.

Figure 8:
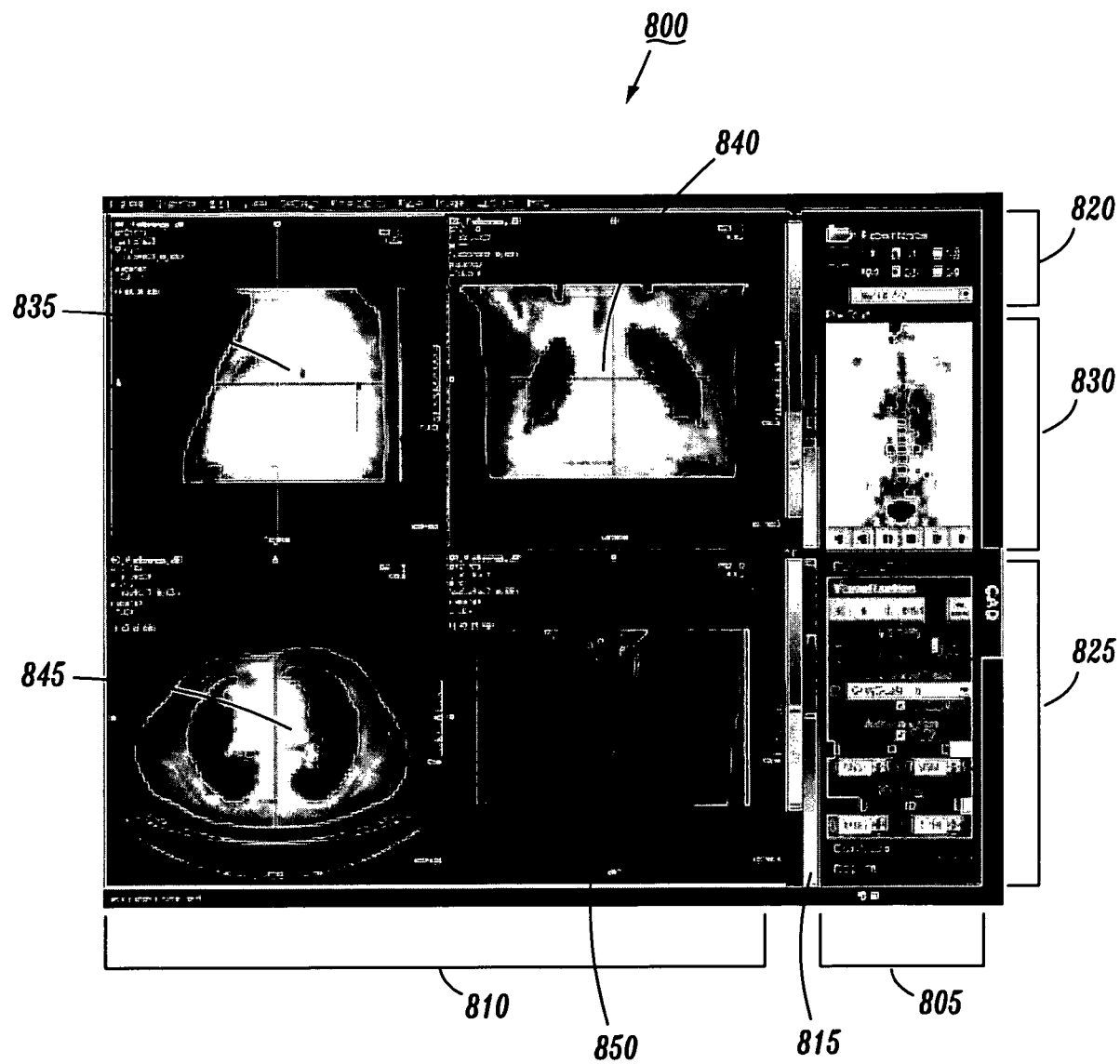
FIG. 8 is a user interface according to another exemplary embodiment of the present invention.

FIG. 8 illustrates a user interface 800 displaying loaded CT and PET image datasets according to an exemplary embodiment of the present invention. Similar to the user interface 200 of FIG. 2, yet alternatively configured, the user interface 800 includes a control area 805, display area 810 and color or blend bars 815. The control area 805 includes a patient folder 820, workflow pane 825 and rotating maximum intensity projection (MIP) 830.

As shown in FIG. 8, the display area 810 is divided into several areas. The areas are: a sagittal display area 835; coronal display area 840; axial or transaxial display area 845 and fused display area 850. The sagittal display area 835 displays views parallel to a patient's long body axis from left to right. The coronal display area 840 displays views parallel to the patient's long body axis and anterior-posterior. The axial or transaxial display area 845 displays views perpendicular to the patient's long body axis. The fused display area 850 displays fused images. For example, the fused display area 850 may be used to display the loaded CT and PET image datasets fused together.

It is to be understood that the display area 810 may be divided into more areas than shown in FIG. 8. In addition, the display areas 835-850 may be configured to display images in any such manner. For example, the display areas 835-850 may be configured to display every image in an axial or sagittal view or be configured such that two images may be in a sagittal view and two images may be in a coronal view.

The display area 810 is further configured such that, when data is loaded in any layout, a multiplanar reconstruction (MPR) of the entire volume is computed, and by default, the middle cut of the volume is displayed depending upon the view. The details of the loaded dataset may also be displayed in the patient folder 820. The display area 810 may go into a wide-screen layout that allows the display area 810 to expand over the control area 805. In other words, when in the wide-screen layout the display area 810 hides the control area 805. The display area 810 may further be configured to display a comparison between pre- and post-therapy images, display a correlated MIP with the pre- and post-therapy images and display the pre- and post-therapy images, correlated MIP and a fused VRT for comparison.

Figure 9:
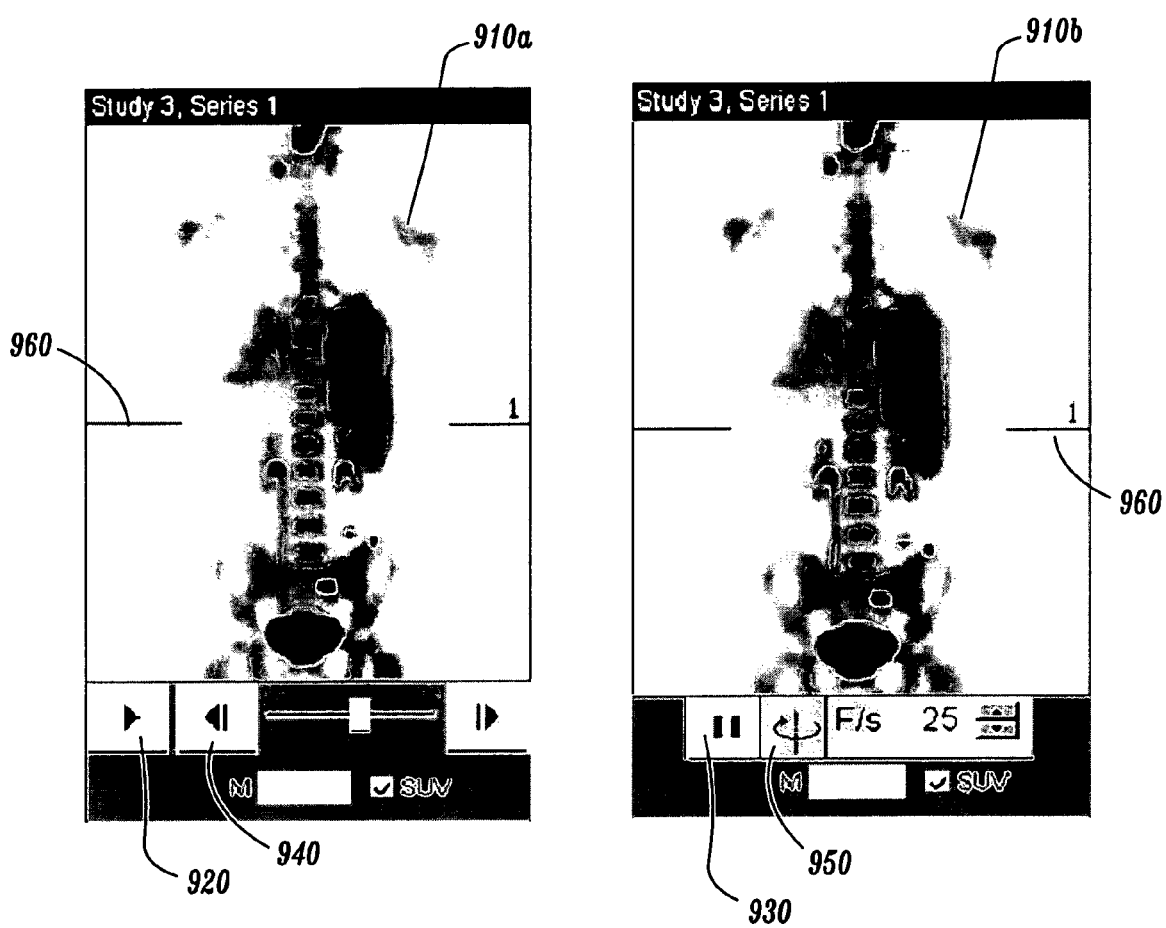
FIG. 9 is a pair of rotating maximum intensity projections (MIPs) of a loaded PET dataset according to an exemplary embodiment of the present invention.

FIG. 9 illustrates a pair of rotating MIPs 910a and 910b of a loaded PET dataset. A MIP algorithm is used to create the rotating MIPs 910a and 910b by calculating a parallel projection of the loaded volume and visualizing maximum values of the volume. MIP 910a is a snapshot of the rotating MIP when it is being played and MIP 910b is a snapshot of the rotating MIP when it is being paused. The rotating MIPs 910a and 910b can be rotated by clicking a play button 920 or paused by clicking a pause button 930. The rotating MIPs 910a and 910b may further be manipulated or controlled by clicking on various control buttons such as a previous frame button 940 or clockwise/anti-clockwise rotate button 950.

As further shown in FIG. 9, a reference line 960 is included in each of the rotating MIPs 910a and 910b. The reference line 960 indicates the position and orientation of the cut plane. For volume filters, the reference line 960 indicates the orientation of the viewing plane. The reference line 960 may be coordinated with images displayed in the various areas of the display area 810. Thus, on each image in the display area 805, the position of the reference line 960 is indicated with another reference line. This, for example, enables a medical practitioner to know in the rotating MIP 910a or 910b, the location of a lesion identified in a certain area of the display area 810. In addition to coordinated reference lines, cursors may also be coordinated or correlated across timepoints. Thus, cursors may be used to point to the same position on image slices of a different modality of the same study or of different studies.

Figure 10:
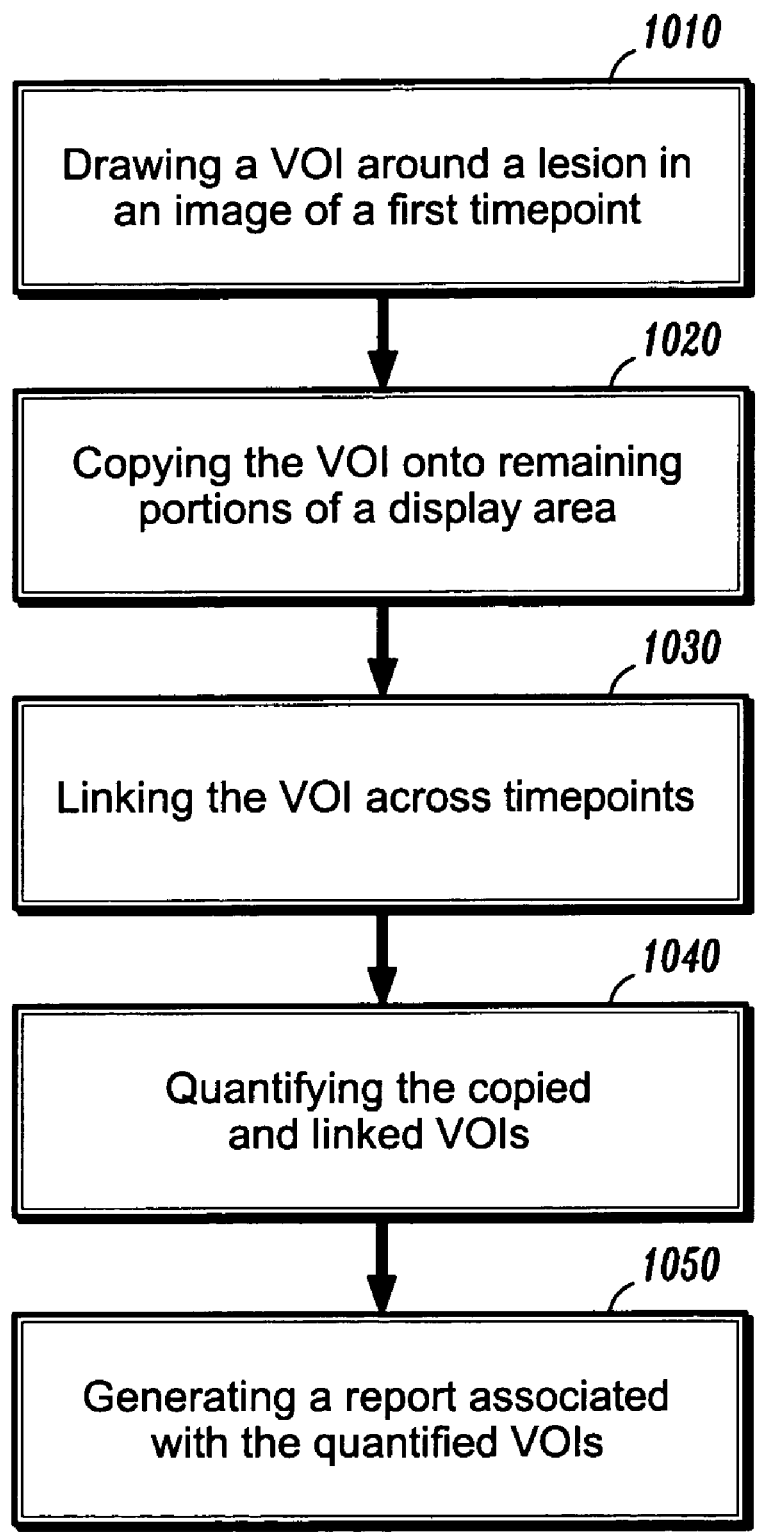
FIG. 10 is a flowchart illustrating a method for multi-modal visualization according to another exemplary embodiment of the present invention.
Figure 11:
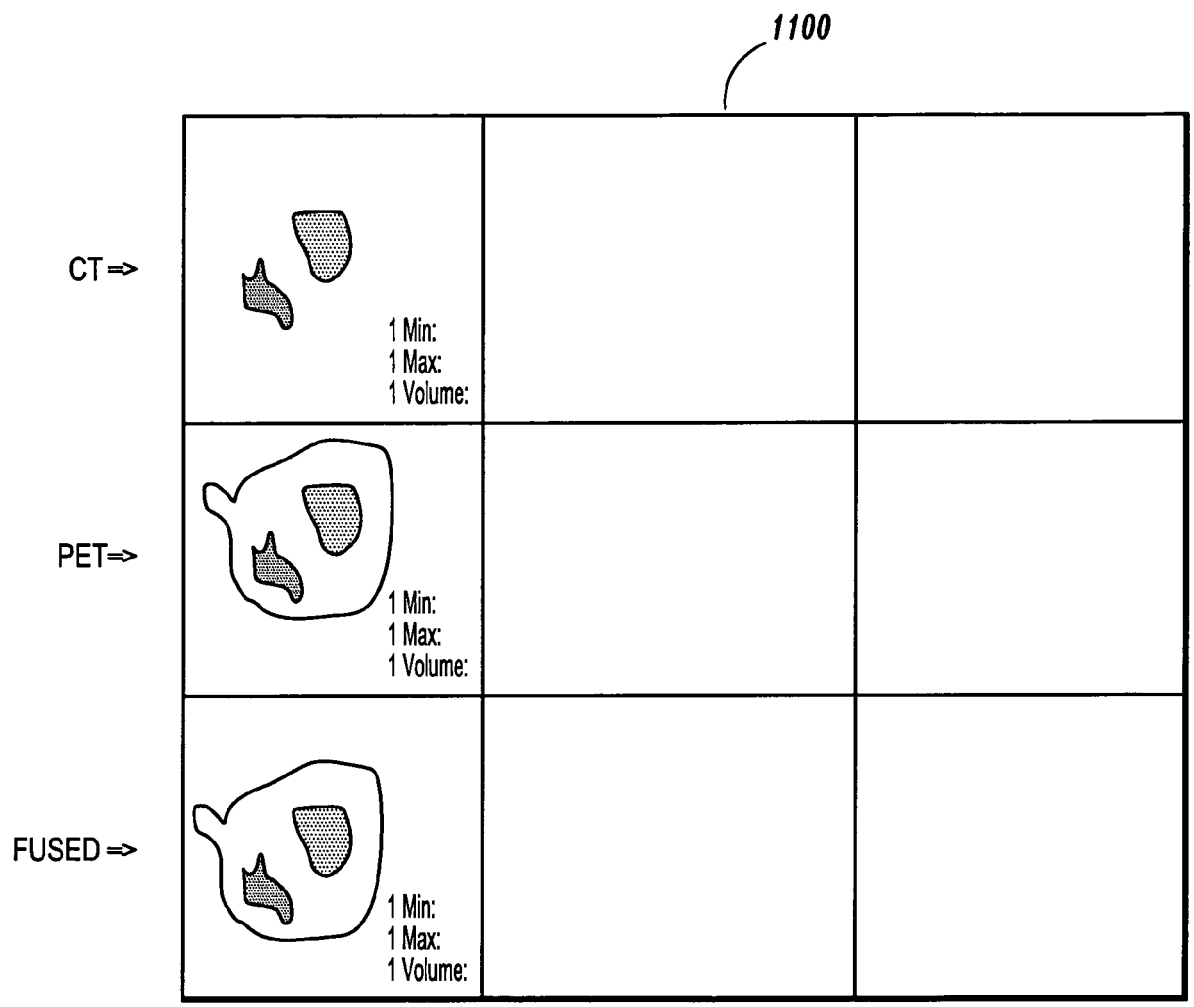
FIG. 11 is a volume of interest (VOI) iso-contouring on a 3×3 layout of a display area according to an exemplary embodiment of the present invention.

FIG. 10 is a flowchart illustrating another method for monitoring disease progression or response to therapy using multi-modal visualization according to an exemplary embodiment of the present invention. As shown in FIG. 10, a user draws a volume of interest (VOI) around, for example, a lesion (1010). This is accomplished by a user selecting an ellipse or free-form iso-contour tool and drawing a boundary around the lesion. This typically takes place when an image is displayed in an axial view. An example of VOI iso-contouring on a 3×3 layout of a display area 1100 is shown in FIG. 11.

Figure 12:
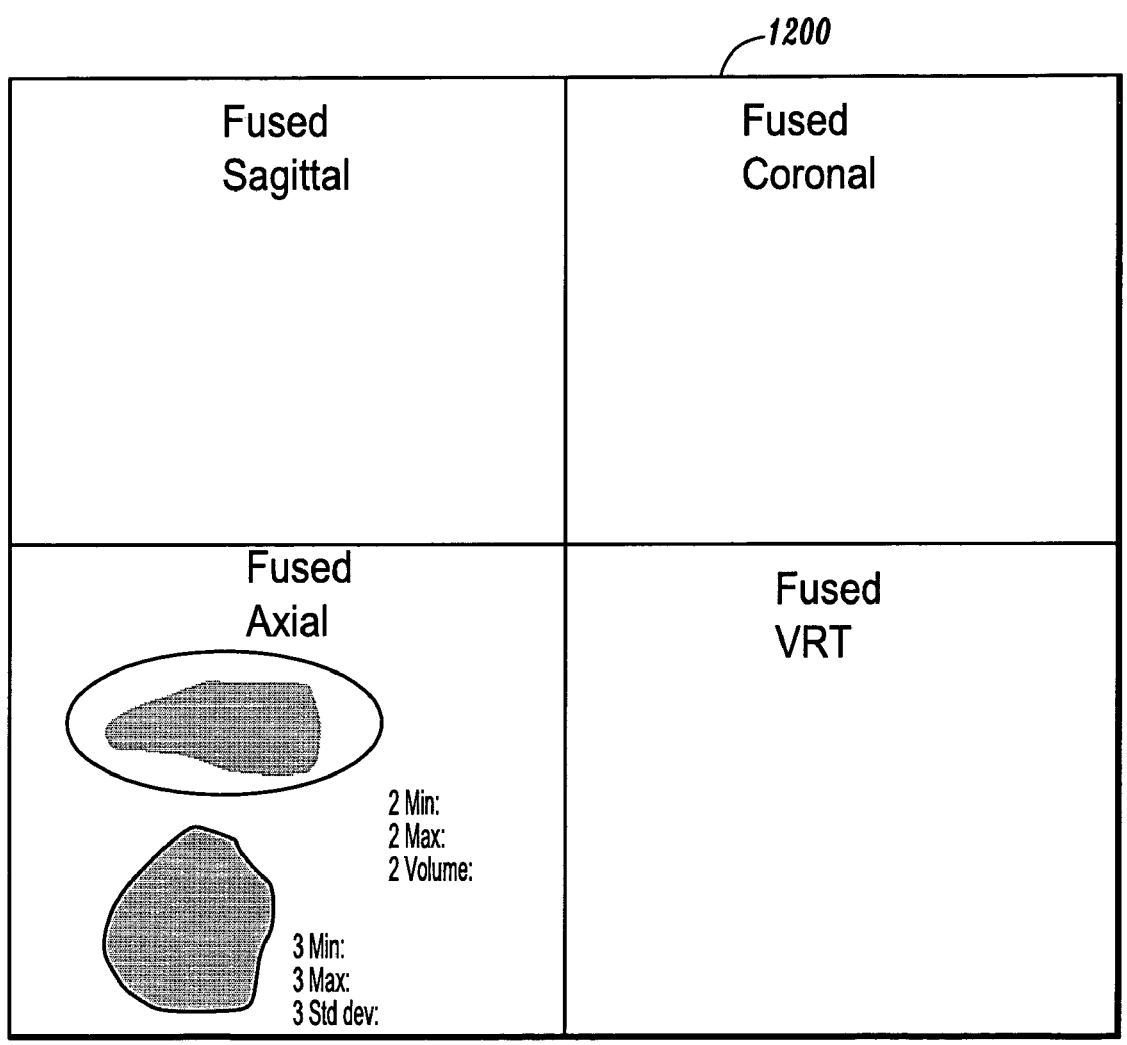
FIG. 12 is a free-form contouring using an elliptical contour in a 2×2 layout of a display area according to an exemplary embodiment of the present invention.

In addition to using the ellipse or free-form iso-contour tool, the user may manually draw a boundary around the lesion using a free-from VOI tool. When the boundary is drawn manually, a horizontal or reference line may also be drawn on a MIP associated with this dataset on a per lesion basis. An example of free-form contouring using an elliptical contour in a 2×2 layout of a display area 1200 is shown in FIG. 12.

After drawing a VOI around a lesion, the user may perform a number of steps; however, for exemplary purposes the VOI is copied onto remaining portions of a display area (1020). In other words, the contours corresponding to the VOI may be copied from one timepoint to another timepoint. The VOI can be copied to a next or previous image slice by selecting a control icon or button of a control area associated with the copying. This will copy the drawn contour or VOI on the same 2D point of the slice next to or before the current slice. Prior to or after copying the contours of the VOI they may be edited. For example, the contours may be nudged to properly bind to the lesion or colored for ease of identification across different modalities.

As the VOI is being copied, it may be linked across timepoints (1030). This enables the tracking of changes and generation of comparison information. To copy a VOI from one timepoint to another, the user selects the VOI and clicks on a button associated with copying the selected VOI to another timepoint. For example, the user selects a VOI in the second timepoint and clicks on the button. The selected VOI is then copied onto the first timepoint at the appropriate voxel coordinate and is automatically linked. In addition to copying the VOI from one timepoint to another, all VOIs may be copied from one timepoint to another. Further, if the user tries to link VOIs in spatially inconsistent locations a warning message may be displayed.

Once the VOI has been copied and linked to remaining portions of the display area, the VOI may be quantified (1040). It is to be understood however that a VOI may be quantified even if it has not been copied. When quantifying the copied VOIs, the user may select any VOI marked over the lesion to know certain quantification parameters associated therewith. For example, the quantification parameters may be minimum, maximum, standard deviation, average, volume and mean of the VOI.

Subsequent to quantifying the VOIs, a report is generated for illustrating the quantification parameters to a medical practitioner (1050). It is to be understood that in addition to creating reports associated with VOIs across multiple timepoints, reports may be created when only a single timepoint is loaded. The report may contain information regarding the comparison of the first and second timepoints. The report may also contain information such as a creation timestamp, last saved timestamp, hospital name, station name, patient name, follow-up screening date, first timepoint details, second timepoint details, user conclusions, lesion details, links to reference images for a particular VOI, links to an image series containing particular VOIs or links to datasets for each loaded timepoint.

Figure 13:
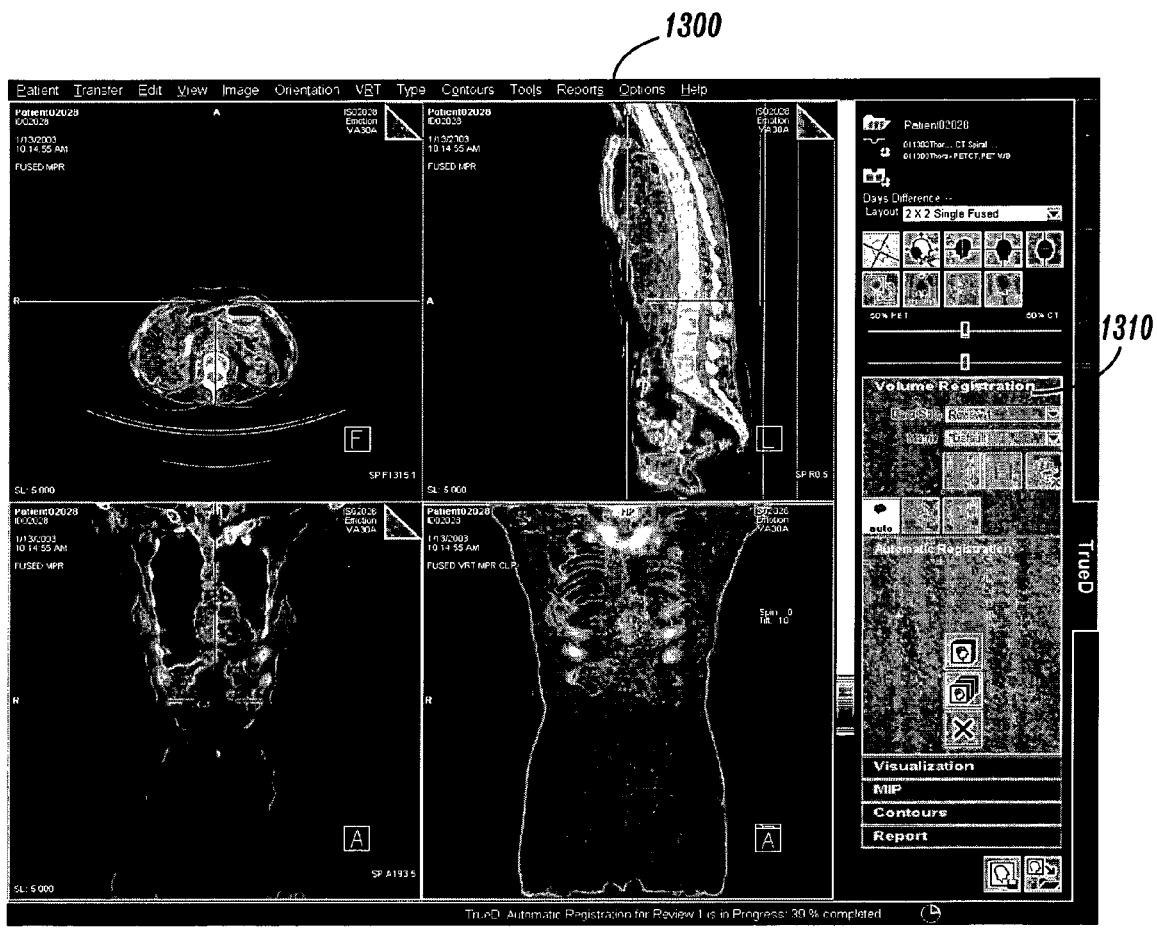
FIG. 13 is a user interface according to an exemplary embodiment of the present invention.
Figure 14:
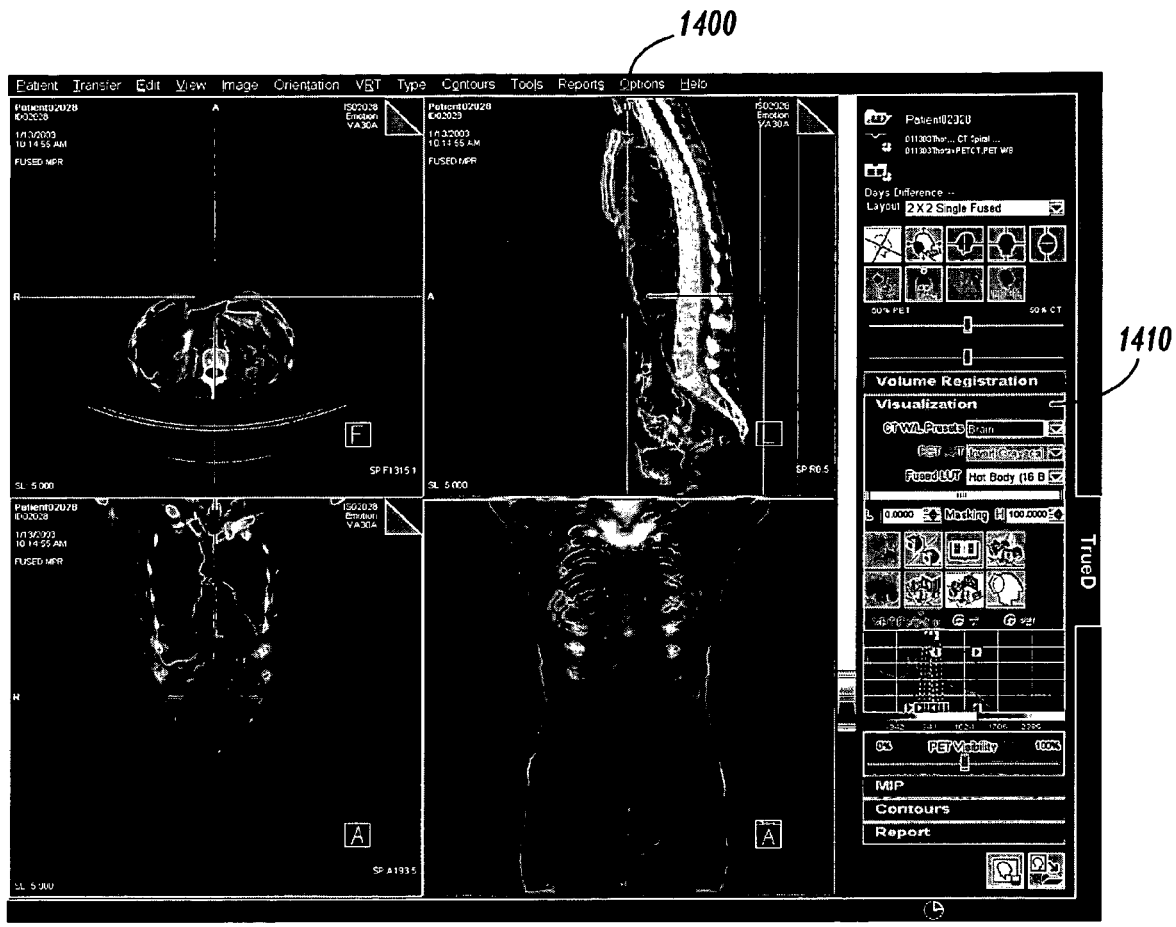
FIG. 14 is a user interface according to another exemplary embodiment of the present invention.
Figure 15:
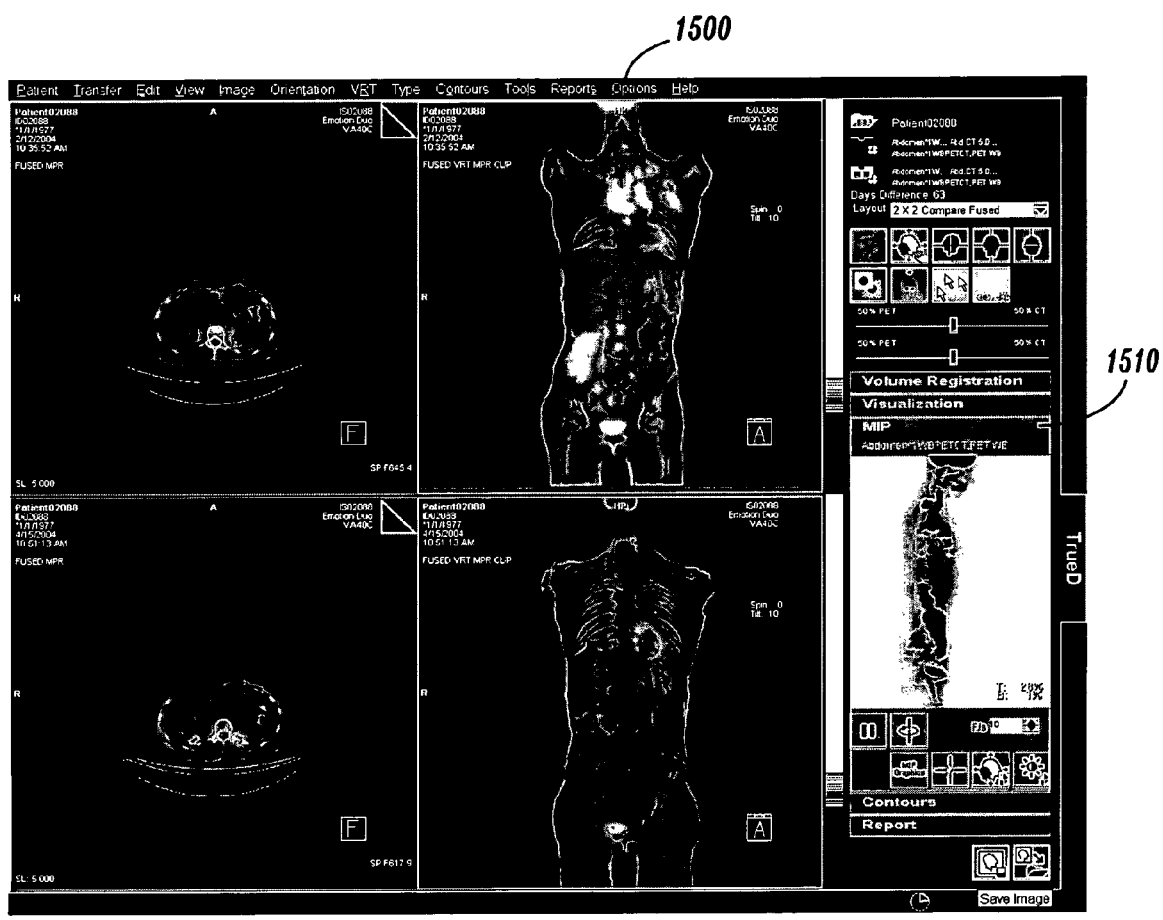
FIG. 15 is a user interface according to yet another exemplary embodiment of the present invention.
Figure 16:
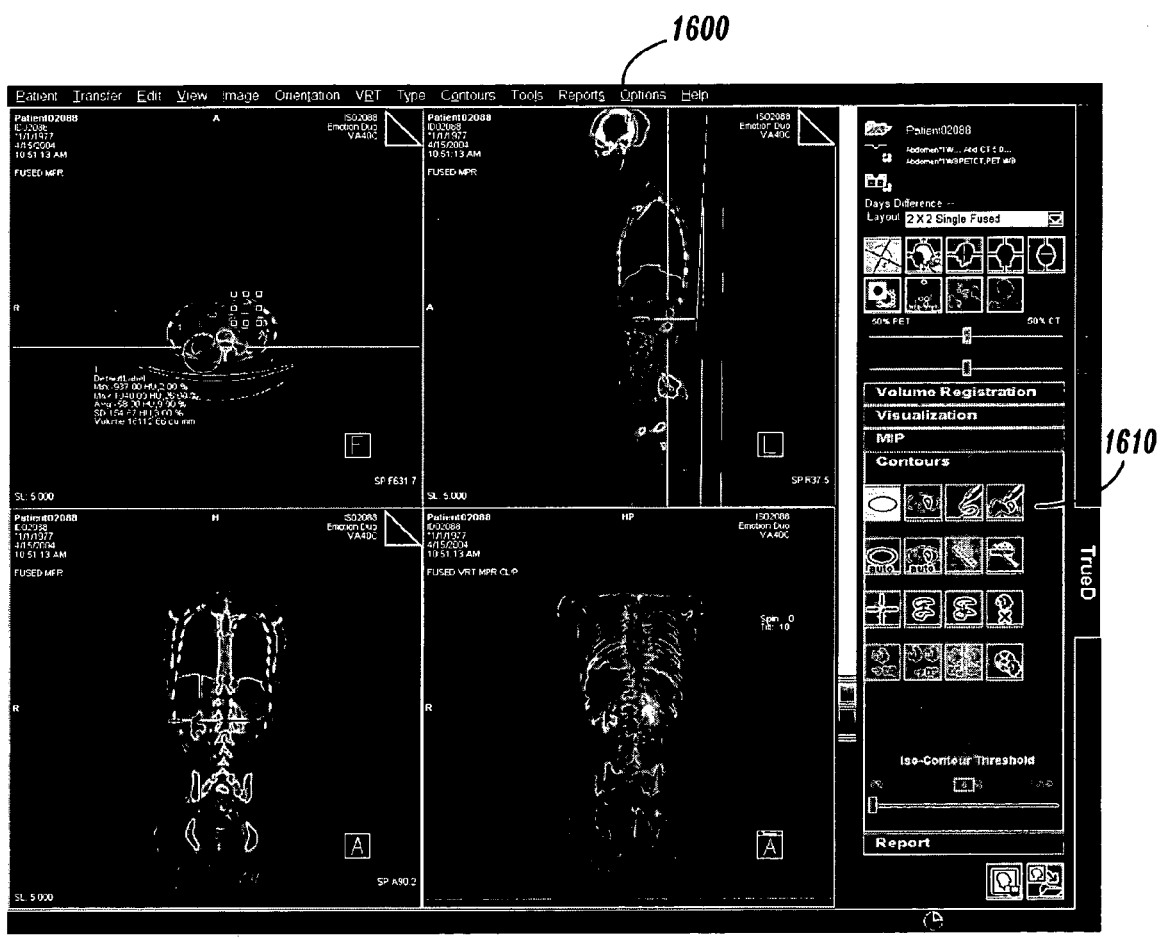
FIG. 16 is a user interface according to an exemplary embodiment of the present invention.
Figure 17:
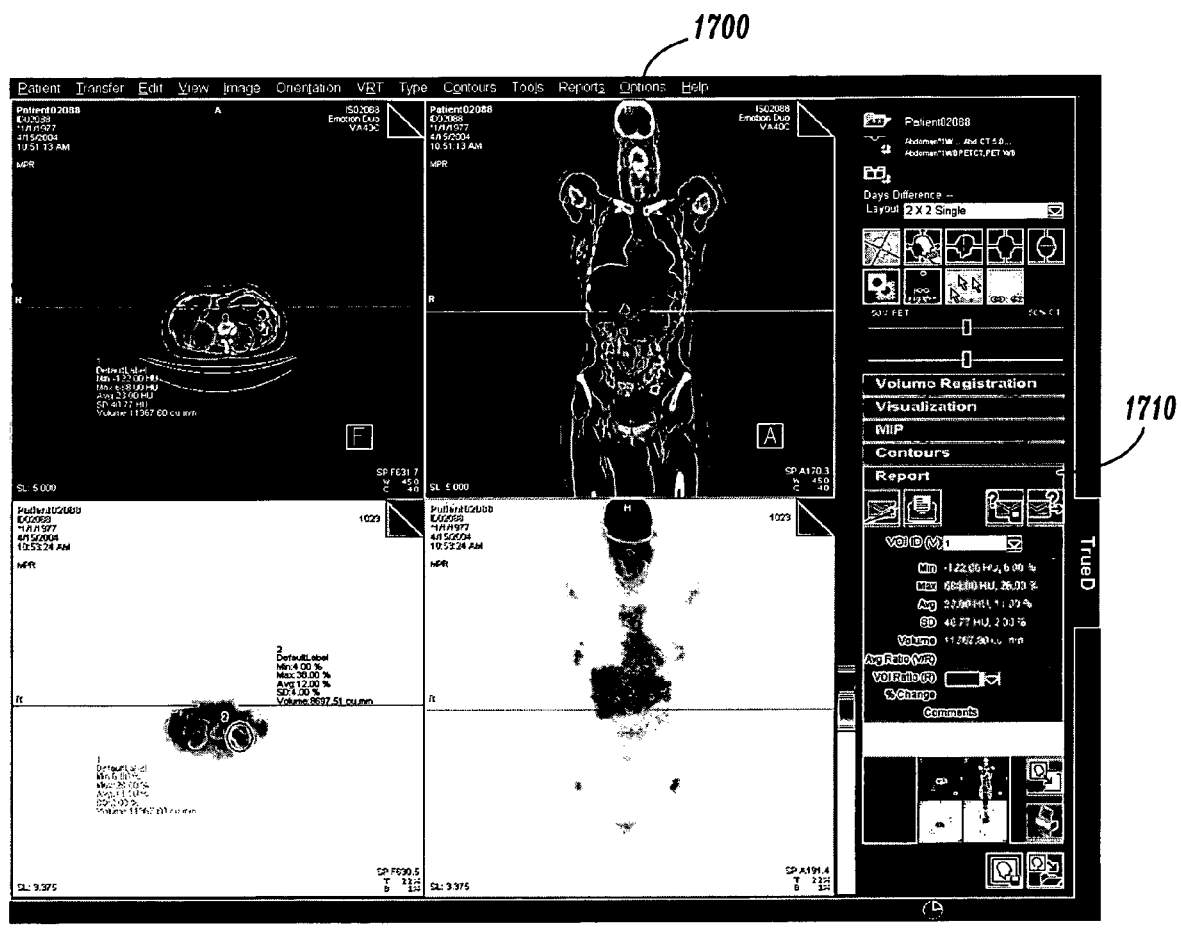
FIG. 17 is a user interface according to another exemplary embodiment of the present invention.

FIGS. 13-17 are included to illustrate the configuration of the workflow pane 230 of FIG. 2, and more particularly, how the workflow pane 230 can be used to perform the functions of its panes in a stepwise fashion. For example FIG. 13, illustrates a registration pane 1310 of a user interface 1300 when a volume registration is being performed. FIG. 14 illustrates a visualization pane 1410 of a user interface 1400 when a visualization is being performed and FIG. 15 illustrates a MIP pane 1510 of a user interface 1500 when a MIP is being displayed. FIG. 16 illustrates a contours pane 1610 of a user interface 1600 when a contouring operation is being performed and FIG. 17 illustrates a report pane 1710 of a user interface 1700 when a report is being generated.

According to an exemplary embodiment of the present invention, medical practitioners can efficiently compare patient scans from two different time points (e.g., pre- and post-therapy). By automatically registering and displaying PET/CT or SPECT-CT image from studies acquired at different times, the present invention assists medical practitioners in making better-informed diagnostic, therapy and follow-up decisions. For example, the present invention provides for the display of volume-rendered CT images fused with functional PET or SPECT datasets. It also enables VOIs to be drawn that calculate standardized uptake values (SUV) within lesions. In addition, VOIs can be copied from one study to the appropriate voxel coordinates of a comparison study.

It is to be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for multi-modal visualization, comprising:
    selecting a first image dataset of a first timepoint, wherein the first image dataset represents an anatomical structure;
    loading the first image dataset of the first timepoint;
    selecting a second image dataset of a second timepoint, wherein the second image dataset represents the anatomical structure;
    loading the second image dataset of the second timepoint, wherein the first and second image datasets were acquired from different modalities;
    registering the first image dataset of the first timepoint with the second image dataset of the second timepoint; and
    displaying an image from the first image dataset of the first timepoint and an image from the second image dataset of the second timepoint at the same time and in separate views,
    wherein the first image dataset of the first timepoint and the second image dataset of the second timepoint each comprise data acquired from a computed tomography (CT), positron emission tomography (PET), single photon emission computed tomography (SPECT), magnetic resonance (MR) or ultrasound modality, and
    wherein the first image dataset of the first timepoint and the second image dataset of the second timepoint each comprise a CT image series and MR image series, a PET image series and SPECT image series, a combination of a CT and PET image series, a combination of an MR and PET image series, a combination of a CT and SPECT image series, a combination of an MR and SPECT image series or an ultrasound image series.

2. The method of claim 1, wherein the image series in each of the first image dataset of the first timepoint and the second image dataset of the second timepoint comprise data from a pre-therapy, ongoing therapy or post-therapy study.

3. The method of claim 1, wherein the first image dataset of the first timepoint and the second image dataset of the second timepoint are registered using automatic registration, landmark registration or visual registration.

4. The method of claim 3, wherein automatic registration used during the step of registering the first image dataset of the first timepoint and the second image dataset of the second timepoint, comprises:
    registering a first image series with a second image series of the first image dataset of the first timepoint;
    registering the first image series of the first image dataset of the first timepoint with a first image series of the second image dataset of the second timepoint; and
    registering the first image series of the second image dataset of the second timepoint with a second image series of the second image dataset of the second timepoint.

5. The method of claim 1, wherein the step of displaying the first image dataset of the first timepoint and the second image dataset of the second timepoint, comprises:
    displaying a first image series and a second image series of the first image dataset of the first timepoint and a first image series and a second image series of the second image dataset of the second timepoint.

6. The method of claim 5, further comprising:
    drawing a volume of interest (VOI) on one of the first image series or second image series of the first image dataset of the first timepoint and the first image series or second image series of the second image dataset of the second timepoint;
    copying the VOI onto remaining image series of the first image dataset of the first timepoint and second image dataset of the second timepoint; and
    linking the VOIs of the first image series and second image series of the first image dataset of the first timepoint and the first image series and second image series of the second image dataset of the second timepoint.

7. The method of claim 6, wherein the VOI is a lesion, tumor or cancerous region.

8. The method of claim 6, further comprising:
    quantifying the VOIs on the first image series and second image series of the first image dataset of the first timepoint and the first image series and second image series of the second image dataset of the second timepoint.

9. The method of claim 8, wherein the quantification is a minimum deviation, maximum deviation, standard deviation, average, volume, mean, diameter area number of pixels or centroid.

10. The method of claim 8, further comprising:
    detecting a change in the VOIs.

11. The method of claim 8, further comprising:
    generating a report associated with the quantified VOIs.

12. The method of claim 1, further comprising:
    calculating a maximum intensity projection (MIP) of the first image dataset of the first timepoint or the second image dataset of the second timepoint; and
    displaying the MIP.

13. The method of claim 12, further comprising:
    coordinating the MIP with the first image dataset of the first timepoint and the second image dataset of the second timepoint.

14. A user interface for multi-modal visualization, comprising:
    a first display area for displaying a first image dataset of a first timepoint and a second image dataset of a second timepoint to compare the first image dataset of the first timepoint and the second image dataset of the second timepoint to each other;
    a second display area for displaying a control area, wherein the control area comprises a patient folder, a workflow pane and controls;
    wherein the first image dataset of the first timepoint and the second image dataset of the second timepoint each comprise data acquired from a computed tomography (CT), positron emission tomography (PET), single photon emission computed tomography (SPECT), magnetic resonance (MR) or ultrasound modality, and
    wherein the workflow pane comprises a registration pane, a visualization pane, a maximum intensity projection (MIP) pane, a contour pane and a report pane, which are arranged in a stepwise fashion so that a user can utilize the functionality of each pane in sequence.

15. The user interface of claim 14, wherein the first image dataset of the first timepoint and the second image dataset of the second timepoint each comprise a CT image series and MR image series a PET image series and SPECT image series, a combination of a CT and PET image series a combination of an MR and PET image series a combination of a CT and SPECT image series, a combination of an MR and SPECT image series or an ultrasound image series.

16. The user interface of claim 15, wherein the image series in each of the first image dataset of the first timepoint and the second image dataset of the second timepoint comprise data from a pre-therapy, ongoing therapy or post-therapy study.

17. The user interface of claim 14, wherein when the first image dataset of the first timepoint and the second image dataset of the second timepoint are each displayed in a sagittal view, coronal view or axial view, the first image dataset and the second image dataset are displayed in a fused view.

18. A system for multi-modal visualization, comprising:
    a memory device for storing a program;
    a processor in communication with the memory device, the processor operative with the program to:
    select a first image dataset of a first timepoint and a second image dataset of a second timepoint;
    load the first image dataset of the first timepoint and the second image dataset of the second time point,
    wherein the first and second image datasets were acquired from different modalities;
    register the first image dataset of the first timepoint with the second image dataset of the second timepoint; and
    display an image from the first image dataset of the first timepoint and an image from the second image dataset of the second timepoint at the same time and in separate views,
    wherein the first image dataset of the first timepoint and the second image dataset of the second timepoint each comprise data acquired from a computed tomography (CT), positron emission tomography (PET), single photon emission computed tomography (SPECT), magnetic resonance (MR) or ultrasound modality, and
    wherein the first image dataset of the first timepoint and the second image dataset of the second timepoint each comprise a CT image series and MR image series, a PET image series and SPECT image series, a combination of a CT and PET image series, a combination of an MR and PET image series, a combination of a CT and SPECT image series, a combination of an MR and SPECT image series or an ultrasound image series.

19. The system of claim 18, wherein the image series in each of the first image dataset of the first timepoint and the second image dataset of the second timepoint comprise data from a pre-therapy, ongoing therapy or post-therapy study.

* * * * *